F. H. ROYCE.
CONTROLLING DEVICE FOR THE ELECTRIC IGNITION SYSTEMS OF INTERNAL COMBUSTION ENGINES.
APPLICATION FILED JULY 24, 1915.
1,163,692.
Patented Dec. 14, 1915.
3 SHEETS—SHEET 1.
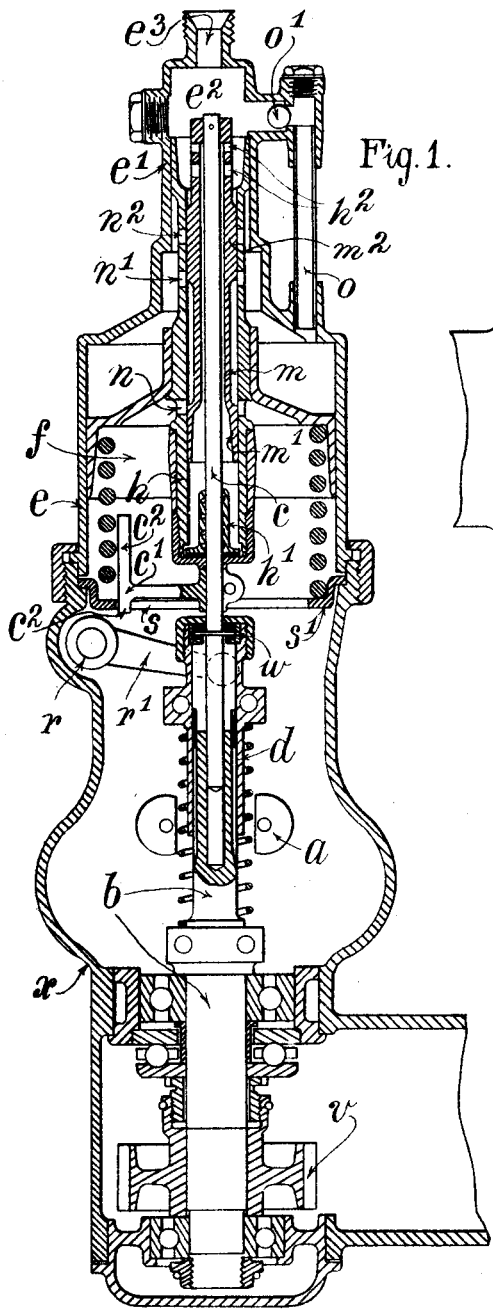
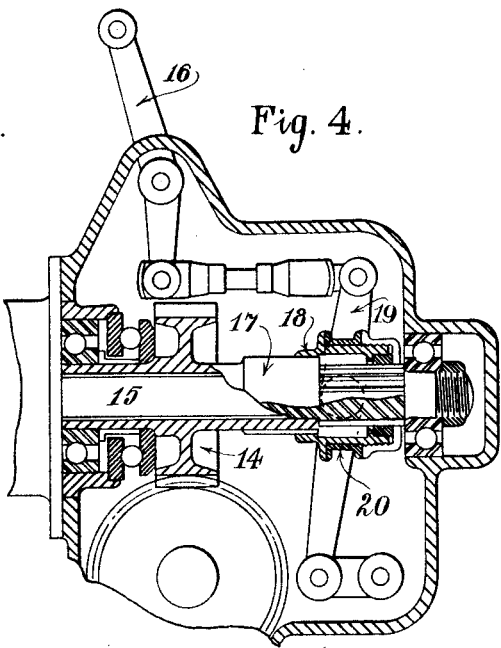
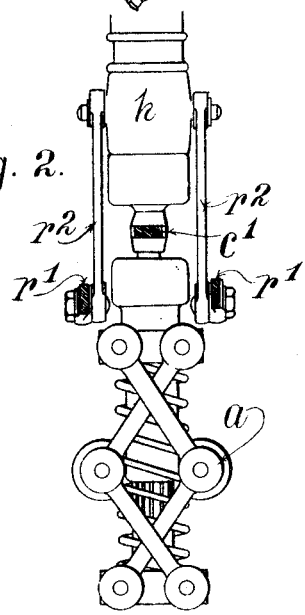
WITNESSES.
Charles E. Vagg
L. Savory.
INVEN
F H Royce
per Robert E. Phillips
Attorney.

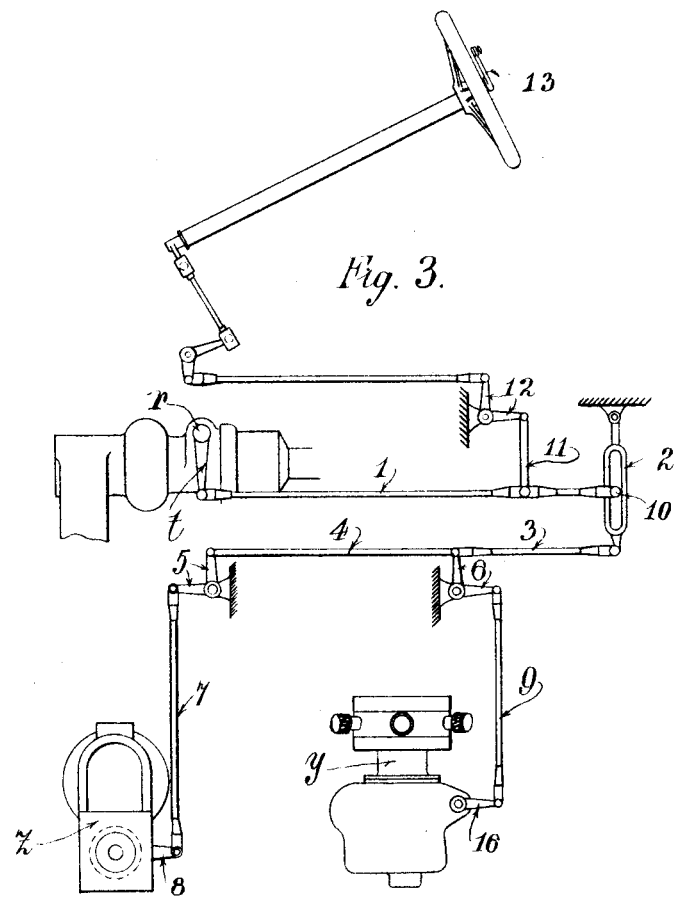

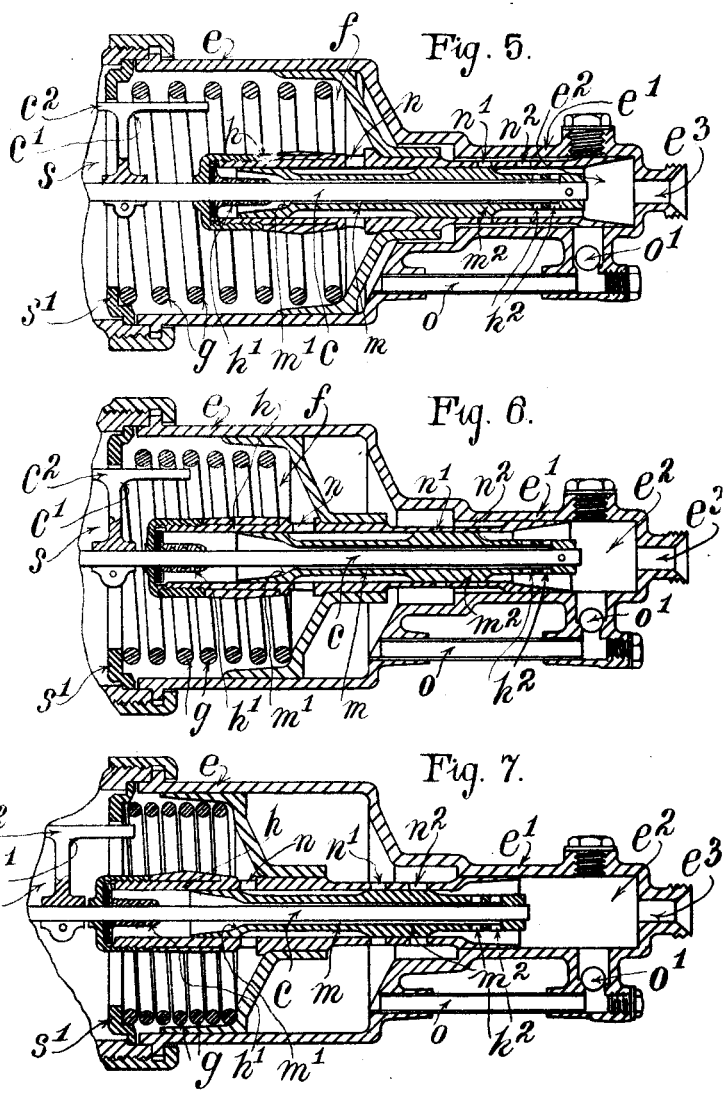
F. H. ROYCE.
CONTROLLING DEVICE FOR THE ELECTRIC IGNITION SYSTEMS OF INTERNAL COMBUSTION ENGINES.
APPLICATION FILED JULY 24, 1915.
1,163,692. Patented Dec. 14, 1915.
3 SHEETS—SHEET 3
WITNESSES.
Charles E. Vagg
D. Savory
INVENTOR
F. H. Royce.
per Robert Phillips.
Attorney

UNITED STATES PATENT OFFICE.

FREDERICK HENRY ROYCE, OF DERBY, ENGLAND.

CONTROLLING DEVICE FOR THE ELECTRIC IGNITION SYSTEMS OF INTERNAL-COMBUSTION ENGINES.

1,163,692.     Specification of Letters Patent.     Patented Dec. 14, 1915.

Application filed July 24, 1915. Serial No. 41,738.

*To all whom it may concern:*

Be it known that I, FREDERICK HENRY ROYCE, a subject of the King of Great Britain and Ireland, and residing at Nightingale Road, Osmaston Road, Derby, England, have invented a new and useful Improvement in Controlling Devices for the Electric Ignition Systems of Internal-Combustion Engines, of which the following is a full and complete specification.

This invention relates to devices for automatically controlling the timing of the ignition of the charges in the cylinders of internal combustion engines, and has for its object to carry out this function more efficiently than has hitherto obtained.

Centrifugal governors have been employed in combination with ignition devices for the purpose of automatically varying the timing of the ignition, but such have not proved entirely satisfactory owing to their lack of sensitiveness due to the excessive work put upon them. My invention not only overcomes this difficulty but provides a ready means of giving an initial advance to the ignition immediately the engine has begun to function in its normal manner. It is well-known that it is desirable and in some cases essential to retard the ignition before starting up an engine, and immediately afterward to moderately advance the ignition. This amount of advance I call the "initial" amount, any further advance being proportional to the speed of the engine.

In previous mechanisms for automatically controlling the ignition the governor has been employed to operate to move the ignition from its position of maximum retard through its whole range, and therefore the whole of the advance has been proportional to the engine speed; an initial advance in this case being impossible.

According to the present invention, the governor instead of actuating the ignition timing device directly is arranged to actuate a valve which controls the admission and release of some fluid pressure—which varies either entirely or in part with the speed of the engine—to and from a cylinder the piston of which is coupled to the timing device of the ignition. A convenient pressure to employ is that of the lubricating oil when said oil is pressure-fed as this enables the control to be so arranged that failure of the pressure in said lubricating system will automatically operate to retard the time of ignition so as to reduce the speed of the engine to a minimum.

In the accompanying drawing which illustrates this invention:—Figure 1 is a view in section showing the governor, the fluid pressure cylinder with its piston and connection to the governor, and the controlling valve and its connections, the various parts being shown in imaginary positions for the sake of distinctness. Fig. 2 is a broken view in plan showing the coupling between the piston of the fluid pressure cylinder and the lever coupled with the timing device of the ignition system. Fig. 3 is a diagrammatic view showing the application of this invention to a dual ignition system comprising a high tension magneto unit and a battery and coil device, the control gear of these two systems being inter-connected, Fig. 4 is a broken view partly in section showing a convenient mechanism for advancing and retarding the contact maker and breaker employed in a battery and coil ignition system, Fig. 5 is a broken view in sectional elevation showing the position of the controlling parts of the mechanism when the pressure has fallen to zero and the engine is stopped, Fig. 6 is a similar view showing the position of the same parts when the engine has been started and is running at such a speed that the oil pressure will move the piston sufficiently to give the desired initial advance, and Fig. 7 is a similar view showing the same parts in a position of maximum advance, the valve ports being under the control of the governor.

Throughout the views similar parts are marked with like letters of reference.

The governor $a$, which is preferably of such a construction that the movement of its sliding part is proportional to the speed of the driving shaft over its whole range, is mounted on a shaft $b$ which runs in suitable bearings carried by a casing $x$, said shaft being driven from the engine through a train of gear wheels of which the final one $y$ only is shown. The action of the governor imparts longitudinal motion to a sliding sleeve $d$ mounted concentrically on and in relation to the shaft $b$. This sleeve is coupled to an axially arranged spindle $c$ by means of a suitable coupling $w$ and said spindle is prevented from rotating while allowing it free longitudinal movement by means of an arm $c^1$ mounted on the spindle and engaging by means of a finger $c^2$ with a slot $s$ in a plate or disk $s^1$ carried by the casing $x$.

Mounted on the casing $x$ in concentric relation to the shaft $b$ and spindle $c$ is a single acting cylinder $e$ the piston $f$ of which has a hollow rod or trunk $h$, the forward end of which lying within the cylinder $e$ is closed and the back end of which lying within an extension $e^1$ of the cylinder $e$ is open, said back end being supported and guided in said extension. In the forward end of the cylinder is a spring $g$ which acts on the piston $f$ to force it toward the back or working end of the cylinder. The spindle $c$ passes through the closed end of the hollow piston rod or trunk $h$ by means of a suitable stuffing box or gland $h^1$ and carries within said hollow rod or trunk a double-acting sleeve valve $m$. The extension $e^1$ of the cylinder $e$ terminates in a chamber $e^2$ into which the pressure fluid is admitted through the passage $e^3$. The interior of the valve $m$ and the closed end of the hollow rod or trunk $h$ are in communication with the chamber $e^2$ by means of holes $h^2$ in said valve whereby the pressure on the valve $m$ is balanced.

In the hollow rod or trunk $h$ are three ports $n$ $n^1$ and $n^2$, the first two of which ($n$ and $n^1$) put the forward or non-working end of the cylinder $e$ into communication with the back or working end of said cylinder through the interior of the hollow rod or trunk $h$; and the third of which ($n^2$) puts the back or working end of the cylinder into communication with the extension $e^1$ thereof. These ports are controlled by the doubleacting valve $m$, the port $n$ by the forward part $m^1$ of the valve, and the ports $n^1$ and $n^2$ by the rear part $m^2$ of said valve.

In the forward or non-working end of the cylinder $e$ in any convenient position (not shown in the drawings) is an outlet for the pressure fluid, and between the back or working end of the cylinder $e$ and the chamber $e^2$ is a passage $o$ which is closed by a suitable ball or other type of non-return valve $o^1$, the function of which is to insure that the pressure in the working part of the cylinder $e$ never exceeds the pressure in the delivery pipe of the chamber $e^2$.

Mounted in suitable bearings in the casing $x$ is a shaft $r$ which is connected by arms $r^1$ and links $r^2$ with the rod or trunk $h$ of the piston $f$, said shaft carrying exterior to the casing an arm or lever $t$ which is coupled to the timing device of the ignition system.

Referring to Fig. 1, the governor shaft is shown in its rearmost position due to the engine speed having fallen, and the piston $f$ is shown on its return to its rearmost position under the influence of the spring $g$.

It will be seen that the port $n^1$ will be entirely cut off after a further slight rearward movement of the piston $f$ when the ball valve $o$ will come into operation to relieve the pressure remaining in the working end of the cylinder due to the reduction of the pressure in the chamber $e^2$ owing to the reduced speed of the engine and the ignition will be retarded to its maximum by means of the spring $g$.

The operation of the governor and control valve when starting the engine is as follows:—With the engine at rest the piston $f$ occupies the position of maximum retard, as shown in Fig. 5. In this position the ports $n^1$ and $n^2$ are open to the chamber $e^2$, and therefore immediately the engine starts oil pressure is exerted on the piston $f$ through these ports against the action of the spring $g$; the piston $f$ therefore together with the trunk $h$ will move until the ports $n^1$ and $n^2$ are cut off by the rear portion $m^2$ of the valve $m$. This movement of the piston constitutes the initial advance, and for any further increase in the engine speed the valve ports $n^1$ and $n^2$ are controlled entirely by the centrifugal governor which insures the advance being proportional to the engine speed.

It will be seen that should the lubricating oil pressure system fail the pressure in the working part of the cylinder $e$ would lift the valve $o^1$ and by putting said part of the cylinder into communication with the chamber $e^2$—through the passage $o$—in which the pressure has fallen, thereby reduce the pressure in the working part of the cylinder so as to enable the spring $g$ to force the piston backward and thus retard the timing device of the ignition.

It is well-known that varying strengths of combustible mixture in the combustion chamber of an engine require a corresponding variation in the ignition timing. Weak mixtures require considerable advance, and to enable the ignition device or devices to be set by hand to suit these varying strengths of combustible mixture I couple the lever $t$ to the timing device or devices by means of adjustable link work operated by the usual steering wheel control. Fig. 3 of the accompanying drawings shows diagrammatically a suitable arrangement of link-work to attain this end, and for the purpose of illustration devices for two ignition systems are shown. The lever $t$ of the automatic governor control is coupled by a suitable link $l$ with a slotted lever 2 pivoted to a convenient fixed part and having its other end coupled by means of links 3 and 4 to the arms of two bell-crank levers 5 and 6, the former of which is coupled by means of the link 7 to the rocking arm 8 of the magneto $z$ and the other of which (6) is coupled by means of the link 9 to the distributer $y$ of the battery ignition. The position of the pin 10 by which the link $l$ is coupled to the slotted lever 2 is capable of being varied in the slot of said lever by means of a link 11 and bell-crank 12 which is coupled to the control lever 13 on the steering wheel by any suitable mechanism. Instead of making one part of the distributer $y$ to rock with respect to the other as is usually done, I prefer to drive the distributer by means which will allow its angularity to be varied. A well-known construction is that illustrated which consists of a sleeve 18 which engages both the shaft 15 and a sleeve carrying the driving wheel 14 by means of longitudinally and spirally arranged keyways or their equivalents, longitudinal motion being imparted to said sleeve by means of a lever 16 which is connected by link-work with a rocking lever 19 which engages a groove 20 in the exterior of said sleeve.

What I claim as my invention, and desire to secure by Letters Patent is:—

1. In electric ignition apparatus for internal combustion engines, the combination with the timing device, of a cylinder having an extension at its rear end and an outlet in its front end, a piston working in said cylinder under fluid pressure in one direction and under the pressure of a spring in the opposite direction, a hollow rod or trunk carried by said piston, a coupling between said rod or trunk and the timing gear of the ignition system, means for the admission of the fluid pressure to the extension of the cylinder, a port in said hollow piston rod or trunk on the non-working side of said piston, two ports in said hollow piston rod or trunk on the working side of said piston, a piston or sleeve valve working in the hollow piston rod or trunk and operating in conjunction with the ports in said rod or trunk to control the flow of the fluid pressure to and from the working end of the cylinder, and a centrifugal governor coupled to said piston or sleeve valve.

2. In electric ignition apparatus for internal combustion engines having a forced or pressure lubricating system, the combination with the timing device, of a cylinder having an extension at its rear end and an outlet in its front end, a piston working in said cylinder under the pressure of the forced lubricating system in one direction and under the pressure of a spring in the opposite direction, a hollow rod or trunk carried by said piston, a coupling between said rod or trunk and the timing gear of the ignition system, means for the admission of the pressure of the lubricating system to the extension of the cylinder, a port in said hollow piston rod or trunk on the non-working side of said piston, two ports in said hollow piston rod or trunk on the working side of said piston, a piston or sleeve valve working in the hollow piston rod or trunk and operating in conjunction with the ports in said rod or trunk to control the flow of the fluid pressure to and from the working end of the cylinder, and a centrifugal governor coupled to said piston or sleeve valve.

3. In electric ignition apparatus for internal combustion engines having a forced or pressure lubricating system, the combination with the timing device, of a cylinder having an extension at its rear end and an outlet in its front end, a piston working in said cylinder under the pressure of the forced lubricating system in one direction and under the pressure of a spring in the opposite direction, a hollow rod or trunk carried by said piston, a coupling between said rod or trunk and the timing gear of the ignition system, means for the admission of the pressure of the forced lubricating system to the extension of the cylinder, a port in said hollow piston rod or trunk on the non-working side of said piston, two ports in said hollow piston rod or trunk on the working side of said piston, a piston or sleeve valve working in the hollow piston rod or trunk and operating in conjunction with the ports in said rod or trunk to control the flow of the fluid pressure to and from the working end of the cylinder, a centrifugal governor coupled to said piston or sleeve valve, and means for automatically causing the piston in the cylinder to operate to retard the timing gear of the ignition if and when the pressure in the lubricating system falls.

4. In an internal combustion engine the combination with two electric ignition systems the one a magneto and the other a battery and coil, of a cylinder having an extension at its rear end and an outlet in its front end, a piston working in said cylinder under fluid pressure in one direction and under the pressure of a spring in the opposite direction, a hollow rod or trunk carried by said piston, means for the admission of the fluid pressure to the extension of the cylinder, a port in said hollow piston rod or trunk on the non-working side of said piston, two ports in said hollow piston rod or trunk on the working side of said piston, a piston or sleeve valve working in the hollow piston rod or trunk and operating in conjunction with the ports in said rod or trunk to control the flow of the fluid pressure to and from the working end of the cylinder, a centrifugal governor coupled to said piston or sleeve valve, mechanism for interconnecting the timing devices of the two ignition systems, a coupling between the rod or trunk of the piston and said inter-connecting mechanism, and means for controlling by hand the angle through which ignition can take place with either of both ignition systems.

5. In an internal combustion engine having a forced or pressure feed lubricating system and two electric ignition systems the one a magneto and the other a battery and coil, the combination with said ignition systems of a cylinder having an extension at its rear end and an outlet in its front end, a piston working in said cylinder under the pressure of the forced lubricating system in one direction and under the pressure of a spring in the opposite direction, a hollow rod or trunk carried by said piston, a coupling between said rod or trunk and the timing gear of the ignition system, means for the admission of the pressure of the forced lubricating system to the extension of the cylinder, a port in said hollow piston rod or trunk on the non-working side of said piston, two ports in said hollow piston rod or trunk on the working side of said piston, a piston or sleeve valve working in the hollow piston rod or trunk and operating in conjunction with the ports in said rod or trunk to control the flow of the fluid pressure to and from the working end of the cylinder, a centrifugal governor coupled to said piston or sleeve valve, mechanism for inter-connecting the timing devices of the two ignition systems, a coupling between the piston rod or trunk and said inter-connecting mechanism, and means for controlling by hand the angle through which ignition can take place with either or both of said ignition systems.

6. In an internal combustion engine having a pressure lubricating system and dual electric ignition systems the combination with the timing device or devices of said systems, of a cylinder having an extension at its rear end and an outlet in its front end, a piston working in said cylinder under the pressure of the forced lubricating system in one direction and under the pressure of a spring in the opposite direction, a hollow rod or trunk carried by said piston, a coupling between said rod or trunk and the timing gear of the ignition system, means for the admission of the pressure of the forced lubricating system to the extension of the cylinder, a port in said hollow piston rod or trunk on the non-working side of said piston, two ports in said hollow piston rod or trunk on the working side of said piston, a piston or sleeve valve working in the hollow piston rod or trunk and operating in conjunction with the ports in said rod or trunk to control the flow of the fluid pressure to and from the working end of the cylinder, a centrifugal governor coupled to said piston or sleeve valve, mechanism for inter-connecting the timing device or devices of the two ignition systems, a coupling between the rod or trunk and said inter-connecting mechanism, means for controlling by hand the angle through which ignition can take place, and means for automatically causing the piston in the cylinder to operate to retard the timing device or devices of the ignition systems if and when the pressure in the lubricating system fails.

In testimony whereof I have signed my name in the presence of two subscribing witnesses.

FREDERICK HENRY ROYCE.

Witnesses:
SYDENHAM PAYN,
S. ARMSTRONG PAYN.